United States Patent [19]
Moore

[11] Patent Number: 5,902,079
[45] Date of Patent: May 11, 1999

[54] COMBINATION DIE AND TAP

[75] Inventor: Richard A. Moore, Newport, Oreg.

[73] Assignee: Bitmoore, an Oregon General Partnership, Salem, Oreg.

[21] Appl. No.: 08/863,438

[22] Filed: May 27, 1997

Related U.S. Application Data

[60] Provisional application No. 60/018,507, May 28, 1996.
[51] Int. Cl.⁶ .............................. B23G 5/04; B23G 5/06; B23G 5/20
[52] U.S. Cl. ......................... 408/215; 408/222; 470/185; 470/199
[58] Field of Search .................................. 408/215, 216, 408/222; 470/185, 198, 199

[56] References Cited

FOREIGN PATENT DOCUMENTS

| | | |
|---|---|---|
| 228746 | 8/1994 | Taiwan . |
| 237720 | 1/1995 | Taiwan . |
| 249363 | 6/1995 | Taiwan . |
| 266519 | 12/1995 | Taiwan . |
| 159359 | 3/1921 | United Kingdom ................... 470/199 |
| 9518693 | 7/1995 | WIPO ................................... 408/215 |

*Primary Examiner*—Steven C. Bishop
*Attorney, Agent, or Firm*—Stoel Rives LLP

[57] ABSTRACT

A thread cutting tool is provided to simultaneously cut opposed concentric screw threads on a connector member. The tool comprises a cylindrical body with radially spaced first and second thread cutting sections and is adapted to cut threads in soft materials to obtain a high precision screw threaded connection.

11 Claims, 3 Drawing Sheets

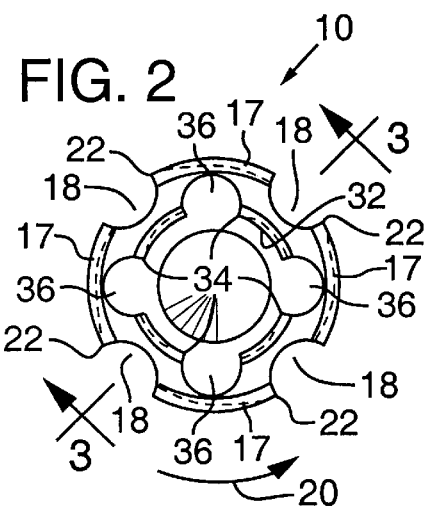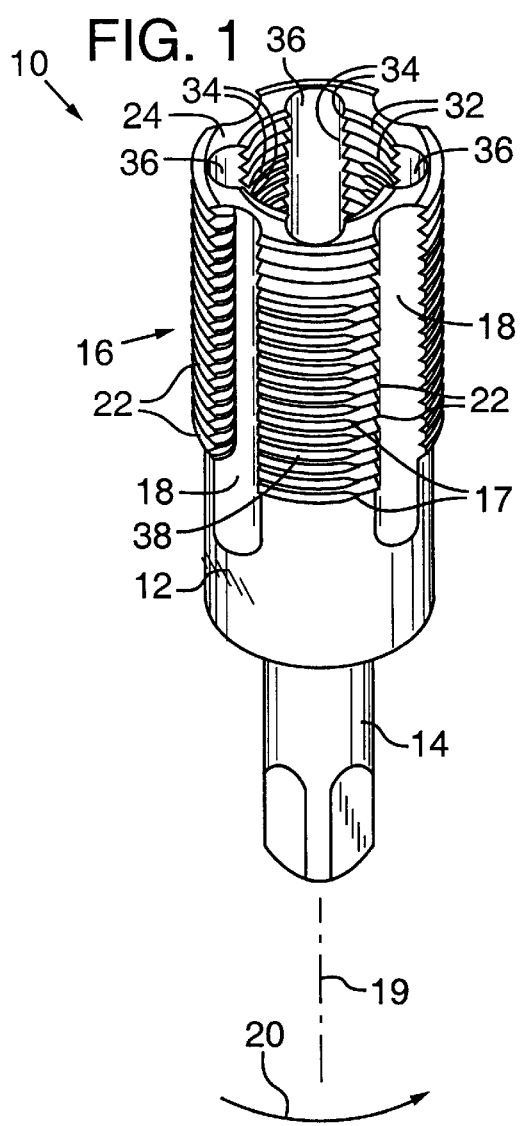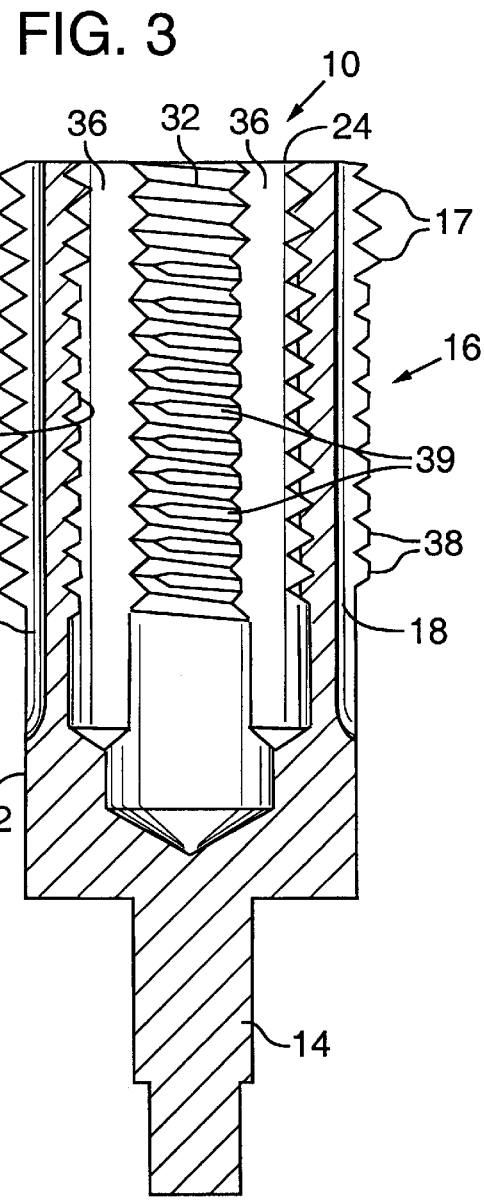

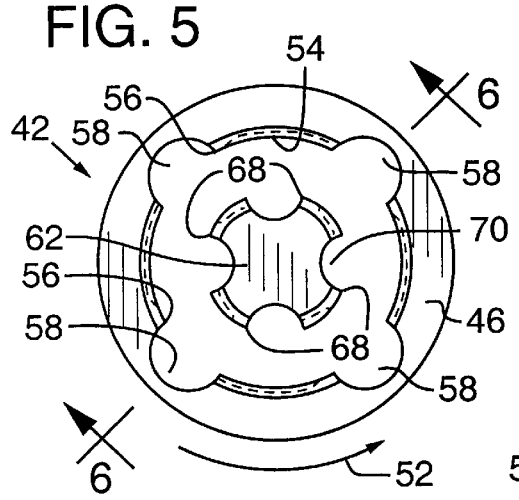
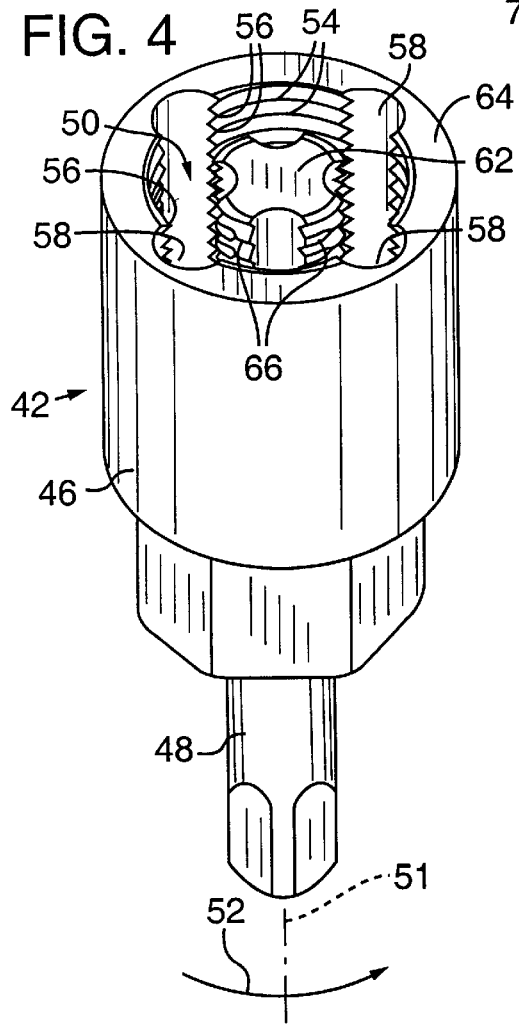
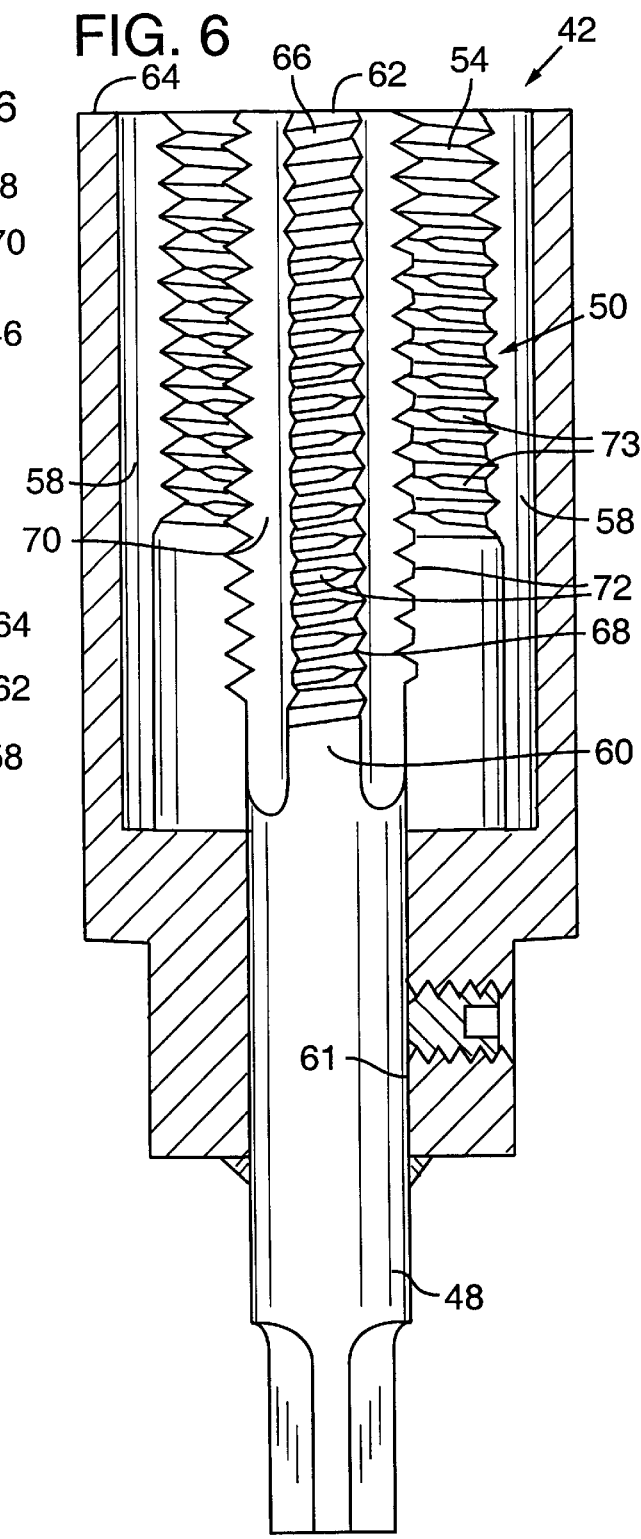

COMBINATION DIE AND TAP

RELATED APPLICATION

This application claims priority from provisional patent application Ser. No. 60/018,507, filed May 28, 1996.

TECHNICAL FIELD

This invention is directed to improvements in thread cutting tools, and more particularly, to a thread cutting tool that simultaneously forms screw threads on opposed concentric surfaces of a connector.

BACKGROUND OF THE INVENTION

Many different thread cutting tools are available for cutting screw threads on a member. For example, standard threading taps have a thread cutting portion usually consisting of a plurality of thread cutting lands spaced by elongated flutes and a shank portion for engagement with a power tool. Such taps are generally used to form internal screw threads in a hole that has been prepared in a connector. Standard thread cutting dies are known for cutting external threads on a connector such as, for example, a bolt. Such dies usually consist of a cutting head with internal thread cutting lands spaced by elongated flutes and may be driven by a power tool. However, these thread cutting tools may not be suitable for cutting screw threads in some softer materials and are limited to cutting only a single surface.

For example, it is difficult to form screw threads in soft metals, such as aluminum and brass, and soft plastics, such as delron and nylon, and other light materials. This is true because these types of materials generally cannot withstand the heat generated by the thread cutting process. The heat generated by the thread cutting process causes the materials to deform or melt.

Even if these soft materials can withstand the thread cutting process to receive threads, it is often difficult to obtain a strong threaded connection between two connector members because there is typically only a single threaded surface on each member through which the connection is made. For example, a bolt has only an external threaded surface for mating engagement with a threaded hole having only an internal threaded surface. Such threaded connections are unsuitable in applications that require a great amount of force because such force may cause the threads to be stripped due to the soft nature of the material.

Another reason strong threaded connections are difficult to obtain in soft materials is because such material may not withstand a substantial amount of torque. If too much torque is applied and the parts are over-tightened, the threads may be stripped due to the soft nature of the material.

In order to provide a strong threaded connection, some threaded connectors are provided with two sets of threads. For example, such connectors may have concentric opposed threaded surfaces that are adapted to mate with concentric opposed threaded surfaces on another member. One type of such a connector may be a pipe or cylinder having threads on both internal and external surfaces for connection with another member having a threaded annular opening with mating internal and external threads. Thus, each part has two threaded surfaces. Such a threaded connection can withstand a greater amount of force because of the increased number of threads. Such threaded connections can also withstand a greater amount of torque to be applied to the parts to obtain a tighter connection.

However, one problem with such concentric threaded connections is that they are difficult and time consuming to manufacture. For example, a two-step process must generally be performed to thread the opposed concentric surfaces of the pipe. First, one surface of the pipe must be threaded with one tool such as a tap to provide internal threads. Then, the opposed concentric surface must be threaded with another tool such as a die to form external threads on the pipe.

In order to form a mating threaded annular opening in a member to which the pipe may be connected, a hole must first be drilled into the member. This hole must then be threaded with a conventional tap to form the internal screw threads on the walls of the hole. Then, an upstanding post or shaft must be manufactured and threaded with a conventional die to form the external screw threads. This post must then be bolted or otherwise secured to the member at a location centrally of the hole. Thus, this member requires separate parts that must undergo individual threading operations. This construction increases the likelihood of a loose connection or what is commonly known as "slop". Thus, there is no known thread cutting tool that simultaneously forms screw threads on concentric opposed surfaces of a threaded connector.

SUMMARY OF THE INVENTION

It is an object of the present invention to provide a thread cutting tool that simultaneously cuts screw threads on concentric opposed surfaces of a connector member.

Another object is to provide a thread cutting tool that provides a high precision screw threaded connection.

Yet another object of the invention is to provide a thread cutting tool that forms screw threads in soft materials.

The present invention provides a thread cutting tool that forms screw threads in concentric opposed surfaces of a connector member in one step. The thread cutting tool has an annular body with opposed concentric thread cutting surfaces.

The body has a shank portion for engagement with a driver to rotate the thread cutting tool about its central axis. The thread cutting tool is rotated to engage concentric opposed surfaces of a connector member to cut screw threads therein.

In one preferred embodiment, the thread cutting tool has an elongated annular body with an external thread cutting surface and an opposed concentric internal thread cutting surface. This embodiment is adapted to cut screw threads in a connector member having an annular hole formed by an outer wall and an opposed inner wall. The thread cutting tool is rotated and advanced within the annular hole so that the external thread cutting surface of the tool cuts screw threads on the outer wall of the connector member while the internal thread cutting surface of the tool simultaneously cuts screw threads on the inner wall of the connector member. Thus, the external thread cutting surface of the tool functions as a die while the internal thread cutting surface of the tool functions as a tap.

In another preferred embodiment, the thread cutting tool comprises an elongated body having a central annular opening formed by an internal thread cutting surface and an opposed concentric external thread cutting surface. This embodiment is adapted to cut screw threads in an annular connector such as, for example, a pipe that has an outer surface and an opposed concentric inner surface. The thread cutting tool is rotated and advanced along length of the annular connector so that the internal thread cutting surface of the tool cuts screw threads on the inner surface of the annular connector while the external thread cutting surface of the tool simultaneously cuts screw threads in the outer surface of the annular connector. Thus, the internal thread cutting surface functions as a tap and the external thread cutting surface functions as a die.

The foregoing and other objectives, features and advantages of the invention will be more readily understood upon consideration of the following detailed description of the invention, taken in conjunction with the accompanying drawings.

BRIEF DESCRIPTION OF THE DRAWINGS

FIG. 1 is a perspective view of one embodiment of a thread cutting tool made in accordance with the invention.

FIG. 2 is a top view of the thread cutting tool of FIG. 1.

FIG. 3 is a sectional view of the thread cutting tool along line 3—3 of FIG. 2.

FIG. 4 is a perspective view of another embodiment of the thread cutting tool.

FIG. 5 is a top view of the thread cutting tool in FIG. 4.

FIG. 6 is a sectional view of the thread cutting tool along lines 6—6 of FIG. 5.

DETAILED DESCRIPTION OF PREFERRED EMBODIMENT

Figure 8:
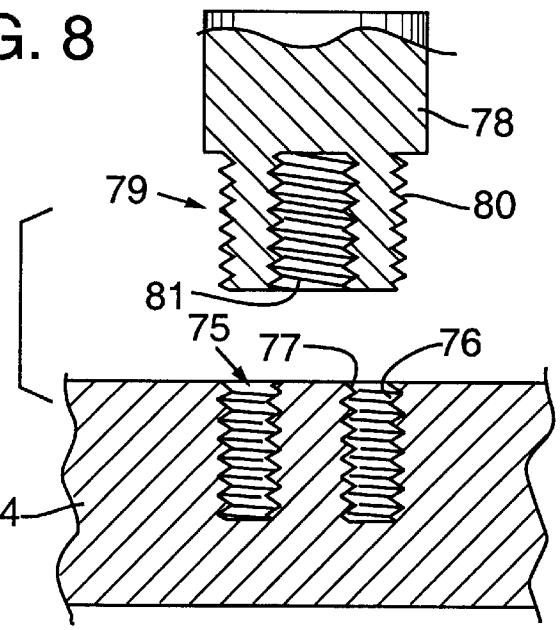
FIG. 8 is a sectional view of the connector members shown in FIG. 7 shown separated from each other.

Referring now to FIGS. 1–3, a thread cutting tool 10 is shown having a cylindrical body 12 with a driver engaging shank 14 for engagement by a powered driver (not shown). At the end opposite the shank 14, the tool 10 has a thread cutting portion 16 that includes a plurality of external lands 17 and a plurality of flutes 18 extending along the outer surface of the body 12. The tool 10 is rotated about its axis 19 in the direction of arrow 20 to cut screw threads in a connector. Cutting edges 22 are located on outer portions of the external lands 17 adjacent the flutes 18 and are aligned longitudinally along the body 12. The thread cutting portion 16 is shown as having a constant diameter. However, it may be desirable to form the end portion near face 24 be provided with a taper or reduced diameter pilot end to properly orient the tool in a bore that is to be threaded.

The internal surface of the body 12 has internal lands 32 that extend along the internal surface. The internal lands 32 have cutting edges 34 on their outer portions that are aligned longitudinally along the body 12. Elongated flutes 36 are formed on the internal surface in a manner similar to the external flutes 19. Although the internal portion of the tool 10 is shown as having a constant diameter, it may be desirable to form an outward taper or pilot portion to properly orient the work piece.

The lands 17 and 32 near the end 24 of the tool 10 have a substantially constant radius. This is necessary to start the threading process by providing enough tool-to-material contact without stripping out the workpiece. However, it is preferred that the remaining majority of lands 17 and 32 have relieved or reduced portions 38 and 39, respectively, that extend away from the cutting edges 22 and 34 as seen most clearly in FIGS. 2 and 3. Such relieved portions 38 and 39 provide clearance between the lands and the member being threaded to reduce heat and to prevent deformation of the member. Thus, only the cutting edges 22 and 34 of the relieved lands 17 and 32 actually contact the member. The thread cutting lands 17 and 32 are constructed and arranged to cut the same size of thread with the same number of threads per inch. Additionally, the thread cutting lands 17 and 32 are timed to form opposed concentric screw threads that start at the same time.

As shown in FIGS. 1–3, the cutting edges 22 and 34 extend perpendicular to the axis 19 of the tool 10. However, these cutting edges 22 and 34 may be inclined (not shown) toward the shank 14 of the tool 10. Preferably the cutting edges 22 and 34 are inclined at an angle to the horizontal greater than zero and less than ninety degrees, with the preferred angle being at about forty-five degrees. This construction causes the chips or the material cut from the member to more easily curl up through the flutes 18 and 36 and exit the thread cutting area. In this example, an opening (not shown) is preferably associated with each flute 36 to allow material cuttings or chips to exit the flutes 36.

Referring more particularly to FIG. 2, it can be seen that the internal flutes 36 and the external flutes 18 are symmetrically spaced about equal angles so that the internal lands 32 are radially opposed to the external flutes 18. Similarly, the external lands 17 are radially opposed to the internal flutes 36. The flutes 18 and 36 receive the material that is cut away as the threads are formed in a manner that is known in the art. Removal of the material through the flutes 18 and 36 reduces accumulation of the material and allows for tapping blind holes. Although four internal flutes and four external flutes are shown, it is to be understood that the tool may have any number of flutes. Additionally, the flutes 18 and 36 may be straight as shown or spiraled about the body of the tool 10.

Figure 9:
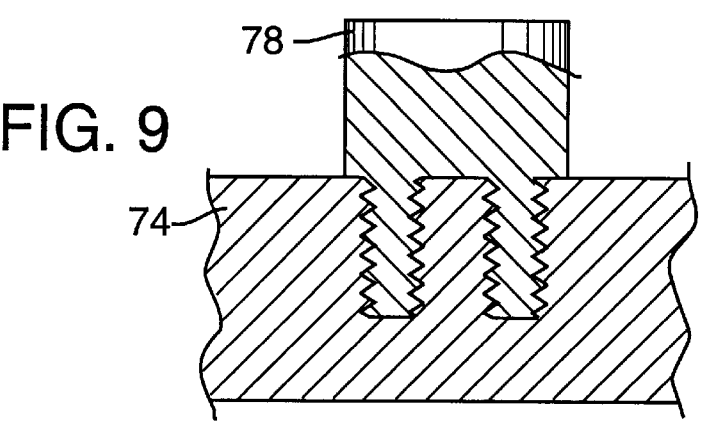
FIG. 9 is a sectional view of the connector members of FIG. 7 shown connected to each other.
Figure 7:
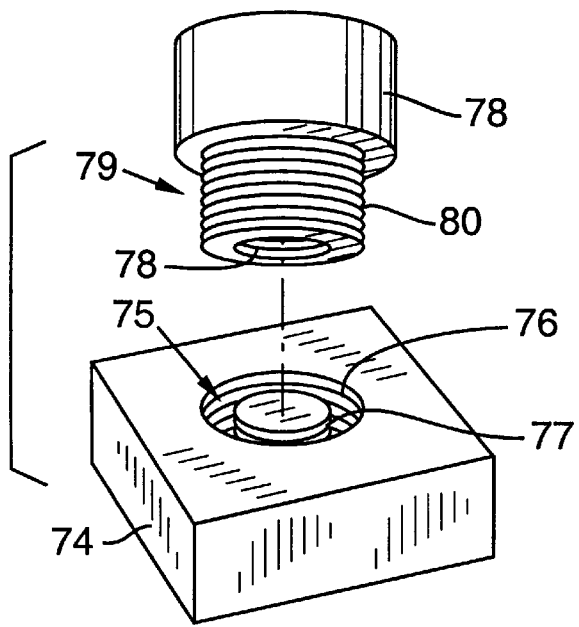
FIG. 7 is a perspective view of two connector members shown apart and each of which include screw threads formed by a thread cutting tool of the present invention.

The thread cutting tool 10 may be used to form screw threads in a connector member 74 (FIGS. 7–9) having an annular hole 75 formed by an outer surface 76 and an inner surface 77. The tool 10 is rotated about its axis 19 in the direction of arrow 20 relative to the connector member 74 and is driven through the annular hole 75 so that the cutting edges 22 of the external thread cutting lands 17 form screw threads in the outer surface 76 of the annular hole 75. Simultaneously, the cutting edges 34 of the internal thread cutting lands 32 form screw threads in the inner surface 77 of the annular hole 75.

Referring now to FIGS. 4–6, another embodiment 42 is shown for cutting opposed concentric screw threads on a member. The tool 42 has a generally cylindrical body 46 with a shank 48 and a thread cutting portion 50. The thread cutting portion 50 includes outer thread cutting lands 54 and opposed concentric inner thread cutting lands 66 that form an annular opening. The shank 48 is adapted to be engaged by a driver (not shown) for rotation about its longitudinal central axis 51 in the direction of arrow 52 to cut threads on the member.

The outer lands 54 have cutting edges 56 with adjacent outer flutes 58 to remove material during cutting. Located centrally within the body 46 are inner lands 66 with cutting edges 68 and a plurality of inner flutes 70. The flutes 70 receive the material cuttings in a manner known in the art. Although four outer flutes 58 and four inner flutes 70 are shown, it is to be understood that the tool 42 may have any number of flutes. Additionally, the flutes may be straight as shown or spiraled.

In a manner similar to the embodiment of the tool 10 shown in FIGS. 1–3, the lands 54 and 66 near the end face 64 of the tool 42 have a substantially constant radius in order to establish firm cutting engagement. It is preferable that the remaining majority of lands 54 and 66 have reduced or relieved portions 72 and 73, respectively, to prevent heat build-up during the thread cutting operation.

Additionally, the cutting edges 56 and 68 are shown extending perpendicular to the axis 52 of the tool 42; however, it is preferred that the cutting edges 56 and 68 extend at an angle to the horizontal greater than zero but less than ninety degrees, with the preferred angle being at about forty-five degrees. In this example, an opening (not shown) is associated with each outer flute 58 to allow material cuttings exit the outer flutes 58 during the cutting operation.

As can be seen most clearly in FIGS. 4 and 5, the inner lands 66 are located radially opposite the outer flutes 58.

Similarly, the outer lands 54 are preferably radially opposite the inner flutes 70. The inner thread cutting lands 66 may be formed unitarily with the shank 48. Alternatively, the inner thread cutting lands 66 may be formed on a separate member such as a conventional tap that is fixed or secured through a central hole 61 in the body 46 by any known manner, such as a set screw. The tap must be secured so that it does not rotate relative to the body 46 while the threads are being cut. Preferably, the tap is fixed to the body 46 by a weld and is secured in such a manner that its end face 62 is flush with the end face 64 of the body 48.

The embodiment of the tool 42 of FIGS. 4–6 is shown in which the inner and outer thread cutters both have substantially a constant diameter. However, it is understood that each thread cutter may be tapered near the end face 62 to provide a lead-in.

The thread cutting tool 42 may be used to form screw threads in a connector member 78 (FIGS. 7–9) having a cylindrical portion 79 formed by an outer surface 80 and an inner surface 81. The tool 42 is rotated about its axis 52 in the direction of arrow 52 relative to the connector member 78 so that the cutting edges 56 and 68 simultaneously form concentric opposed screw threads in the connector member 78.

Preferably, the cutting edges of each embodiment of the tools 10 and 42 are aligned and timed to form screw threads that start at the same time. Timed thread cutters provide mating threads on the mating connector members that start simultaneously. This provides an easier connection between the threaded parts and prevents cross threading.

While it will be apparent that the embodiments illustrated herein are well calculated to fulfill the objects above stated, it will be apparent that the present invention is susceptible to modification, variation and change without departing from the proper scope or fair meaning of the invention. For example, if it is ever desired to form any number of concentric threaded annular holes and a mating part to be threaded therein, it is within the scope of this invention that a combination die and tap may be provided with a plurality of concentric thread cutting taps and dies.

I claim:

1. A tool for cutting screw threads into a member, comprising:

an elongated annular body having a shank at a first end of the body adapted for engagement with a driver to rotate the body in a cutting direction about an axis and a thread cutting portion extending along the body from a second end thereof;

the thread cutting portion including a first thread cutting section and a second thread cutting section radially spaced from the first thread cutting section, the first and second thread cutting sections constructed and arranged to simultaneously cut screw threads on concentrically opposed surfaces of the member, the first thread cutting section having a first set of lands with first cutting edges spaced by a first set of flutes and the second thread cutting section having a second set of lands with second cutting edges spaced by a second set of flutes;

the first set of lands including first and second subsets of lands, the first subset positioned adjacent the second end of the body, each land in the first subset having a substantially constant radius relative to the axis, and the second subset positioned between the first subset and the first end of the body, each land in the second subset comprising first leading and first trailing contiguous angular segments extending different radial distances from the axis, the first leading angular segment including one of the first cutting edges and the first trailing angular segment forming a recessed region relative to the first leading angular segment and thereby forming a first relieved portion trailing away from the one of the first cutting edges in an angular direction opposite to the cutting direction; and the second set of lands including third and fourth subsets of lands, the third subset positioned adjacent the second end of the body, each land in the third subset having a substantially constant radius relative to the axis, and the fourth subset positioned between the third subset and the first end of the body, each land in the fourth subset comprising second leading and second trailing contiguous angular segments extending different radial distances from the axis, the second leading angular segment including one of the second cutting edges and the second trailing angular segment forming a recessed region relative to the second leading angular segment and thereby forming a second relieved portion trailing away from the one of the second cutting edges in an angular direction opposite to the cutting direction.

2. The tool of claim 1 wherein the annular body has concentric internal and external surfaces, the first thread cutting surface being located on the external surface of the body and the second thread cutting surface being located on the internal surface of the body.

3. The tool of claim 2 wherein the lands in the first set of lands are located radially opposite the flutes in the second set of flutes, and the lands in the second set of lands are located radially opposite the flutes in the first set of flutes.

4. The tool of claim 3 wherein the flutes in the first set of flutes are equiangularly spaced from the flutes in the second set of flutes.

5. The tool of claim 1, wherein:

the annular body has an annular opening formed by an inner surface and an outer surface, the first thread cutting surface being located on the inner surface and the second thread cutting surface being located on the outer surface.

6. The tool of claim 5 wherein the lands in the first set of lands are located radially opposite the flutes in the second set of flutes and the lands in the second set of lands are located radially opposite the flutes in the first set of flutes.

7. The tool of claim 6 wherein the flutes in the first set of flutes are equiangularly spaced from the flutes in the second set of flutes.

8. The tool of claim 1 wherein the first and second thread cutting sections are timed with each other to cut threads that start at the same time into the member.

9. The tool of claim 1 wherein there are greater numbers of lands in the second and fourth subsets than numbers of lands in the first and third subsets, respectively.

10. The tool of claim 1 wherein the first leading angular segment is shorter than the first trailing angular segment of each land in the second subset.

11. The tool of claim 10 wherein the second leading angular segment is shorter than the second trailing angular segment of each land in the fourth subset.

* * * * *